(12) United States Patent
Zehnder, II et al.

(10) Patent No.: US 7,530,227 B2
(45) Date of Patent: May 12, 2009

(54) BRAKE APPLY MASTER CYLINDER

(75) Inventors: James W. Zehnder, II, Tipp City, OH (US); Michael W. Hurtt, Waynesville, OH (US); Chris C. Carter, Kettering, OH (US)

(73) Assignee: Delphi Technologies, Inc., Troy, MI (US)

( * ) Notice: Subject to any disclaimer, the term of this patent is extended or adjusted under 35 U.S.C. 154(b) by 223 days.

(21) Appl. No.: 11/641,645

(22) Filed: Dec. 19, 2006

(65) Prior Publication Data

US 2008/0143054 A1 Jun. 19, 2008

(51) Int. Cl.
*B60T 11/16* (2006.01)
*B60T 17/18* (2006.01)

(52) U.S. Cl. .......................... 60/561; 60/588

(58) Field of Classification Search ................. 60/561, 60/581, 585, 588, 546
See application file for complete search history.

(56) References Cited

U.S. PATENT DOCUMENTS

| | | | | |
|---|---|---|---|---|
| 3,376,704 A | * | 4/1968 | Ihnacik, Jr. | 60/561 |
| 3,729,932 A | * | 5/1973 | Nakashima | 60/561 |
| 4,161,105 A | * | 7/1979 | Hagiwara | 60/561 |
| 4,475,338 A | * | 10/1984 | Gaiser | 60/581 |
| 5,161,375 A | * | 11/1992 | Crumb et al. | 60/585 |
| 5,890,364 A | * | 4/1999 | Linkner et al. | 60/561 |
| 6,272,858 B1 | * | 8/2001 | Takano et al. | 60/588 |
| 7,040,093 B2 | * | 5/2006 | Legret et al. | 60/588 |
| 7,340,894 B2 | * | 3/2008 | Miyahara et al. | 60/526 |
| 2005/0016174 A1 | * | 1/2005 | Tsubouchi et al. | 60/588 |

FOREIGN PATENT DOCUMENTS

| | | |
|---|---|---|
| DE | 3938892 | 5/1991 |
| EP | 0088019 | 9/1983 |
| WO | 9732764 | 9/1997 |

OTHER PUBLICATIONS

EP Search Report dated May 27, 2008.

* cited by examiner

*Primary Examiner*—Thomas E Lazo
(74) *Attorney, Agent, or Firm*—Thomas N. Twome

(57) ABSTRACT

A brake apply master cylinder includes a body and a piston assembly. The body includes a bore. The bore has a longitudinal axis, a closed front end, a primary fluid outlet fluidly connectable to a primary brake circuit, and a secondary fluid outlet fluidly connectable to a secondary brake circuit. The piston assembly includes a single brake apply piston positioned in the bore. The piston assembly fluidly divides the bore into a primary fluid chamber in fluid communication with the primary fluid outlet and a secondary fluid chamber in fluid communication with the secondary fluid outlet. Another brake apply master cylinder includes a body, a piston assembly, and a return spring assembly. The return spring assembly is positioned in the bore of the body and extends from the closed front end of the bore to a return-spring seat of a single brake apply piston of the piston assembly.

1 Claim, 2 Drawing Sheets

US 7,530,227 B2

BRAKE APPLY MASTER CYLINDER

TECHNICAL FIELD

The present invention relates generally to braking systems, and more particularly to a brake apply master cylinder.

BACKGROUND OF THE INVENTION

Conventional vehicle braking systems include those having a brake pedal operatively connected to a booster which is operatively connected to a brake apply master cylinder. In one known system, the brake apply master cylinder includes a primary brake apply piston (having attached seals) and a secondary brake apply piston (having attached seals) arranged in tandem within the bore of the brake-apply-master-cylinder body. Systems having annular lip seals supported by the brake-apply-master-cylinder body (instead of piston-attached seals) are also known. It is noted that seals supported by the brake-apply-master-cylinder body are known as fixed seals, and seals attached to the piston are referred to as moving seals.

During brake apply, the primary brake apply piston moves longitudinal forward (toward the closed front end of the bore of the brake-apply-master-cylinder body) which compresses a first spring which moves the secondary brake apply piston longitudinally forward which compresses a second spring seated against the closed front end of the bore. Such longitudinally forward movement compresses the brake fluid in the primary brake circuit which is in fluid communication with the bore between the primary and secondary brake apply pistons and compresses the brake fluid in the secondary brake circuit which is in fluid communication with the bore longitudinally forward of the secondary brake apply piston. The pressure is the same in both braking circuits.

During brake release, the springs return the primary and secondary brake apply pistons to their rest positions. This allows fluid communication of the primary brake circuit with the primary brake fluid reservoir of the braking system via the bore and allows fluid communication of the secondary brake circuit with the secondary brake fluid reservoir of the braking system via the bore, as is known to those skilled in the art.

What is needed is an improved brake apply master cylinder.

SUMMARY OF THE INVENTION

A first expression of a first embodiment of the invention is for a brake apply master cylinder including a brake-apply-master-cylinder body and a piston assembly. The brake-apply-master-cylinder body includes a bore. The bore has a longitudinal axis, a closed front end, a primary fluid outlet fluidly connectable to a primary brake circuit, and a secondary fluid outlet fluidly connectable to a secondary brake circuit. The piston assembly includes a single brake apply piston positioned in the bore. The piston assembly fluidly divides the bore into a primary fluid chamber in fluid communication with the primary fluid outlet and a secondary fluid chamber in fluid communication with the secondary fluid outlet. The primary fluid chamber has a first chamber volume and the secondary fluid chamber has a second chamber volume. Longitudinal forward movement of the single brake apply piston reduces the first and second chamber volumes.

A second expression of a first embodiment of the invention is for a brake apply master cylinder including a brake-apply-master-cylinder body and a piston assembly. The brake-apply-master-cylinder body includes a bore. The bore has a longitudinal axis, a closed front end, a primary fluid outlet fluidly connectable to a primary brake circuit, and a secondary fluid outlet fluidly connectable to a secondary brake circuit. The piston assembly includes a single brake apply piston and a pressure equalization piston each positioned in the bore. The pressure equalization piston is slidably engageable with and disposed radially inward of the single brake apply piston. The single brake apply piston and the pressure equalization piston together fluidly divide the bore into a primary fluid chamber in fluid communication with the primary fluid outlet and a secondary fluid chamber in fluid communication with the secondary fluid outlet. The primary fluid chamber has a first chamber volume and the secondary fluid chamber has a second chamber volume. Longitudinal forward movement of the single brake apply piston reduces the first and second chamber volumes. The pressure equalization piston has a first end in fluid communication with the primary fluid chamber and a second end in fluid communication with the secondary fluid chamber.

A third expression of a first embodiment of the invention is for a brake apply master cylinder including a brake-apply-master-cylinder body, a piston assembly, and a return spring assembly. The brake-apply-master-cylinder body includes a bore. The bore has a longitudinal axis, a closed front end, a primary fluid outlet fluidly connectable to a primary brake circuit, and a secondary fluid outlet fluidly connectable to a secondary brake circuit. The piston assembly includes a single brake apply piston positioned in the bore. The piston assembly fluidly divides the bore into a primary fluid chamber in fluid communication with the primary fluid outlet and a secondary fluid chamber in fluid communication with the secondary fluid outlet. The primary fluid chamber has a first chamber volume and the secondary fluid chamber has a second chamber volume. Longitudinal forward movement of the single brake apply piston reduces the first and second chamber volumes. The return spring assembly is positioned in the bore and extends from the closed front end to a return-spring seat of the single brake apply piston.

Several benefits and advantages are derived from one or more of the expressions of an embodiment of the invention. In one example, the single brake apply piston reduces total piston stroke compared to the total piston stroke of a conventional system having two brake apply pistons and an intervening spring.

DETAILED DESCRIPTION

Figure 1:
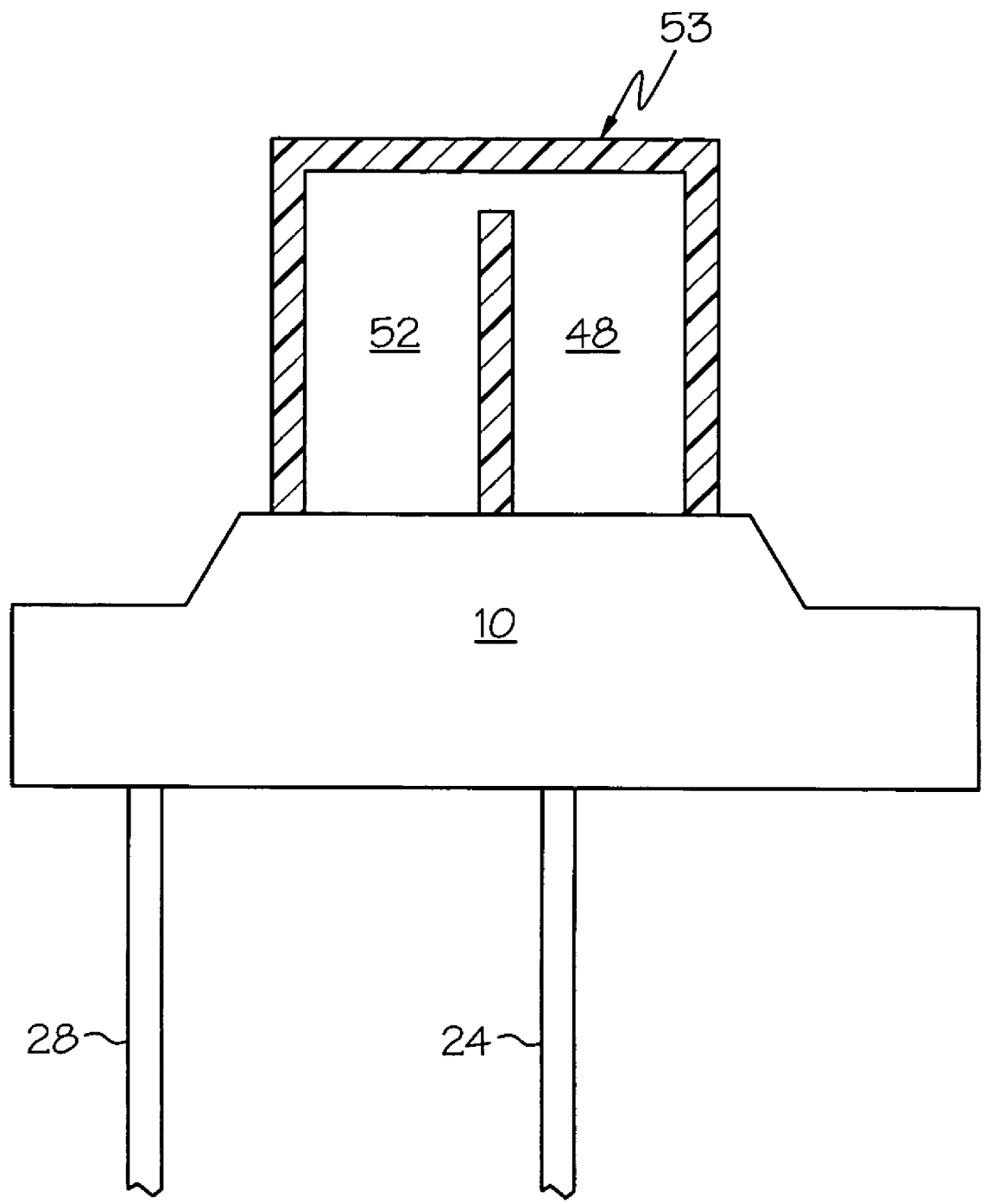
FIG. 1 is a diagram of a portion of a braking system including: a brake fluid tank having primary and secondary brake fluid reservoirs; an embodiment of a brake apply master cylinder; and beginning portions of primary and secondary brake circuits, wherein the brake fluid tank is shown in cross section to illustrate the two reservoirs.
Figure 2:
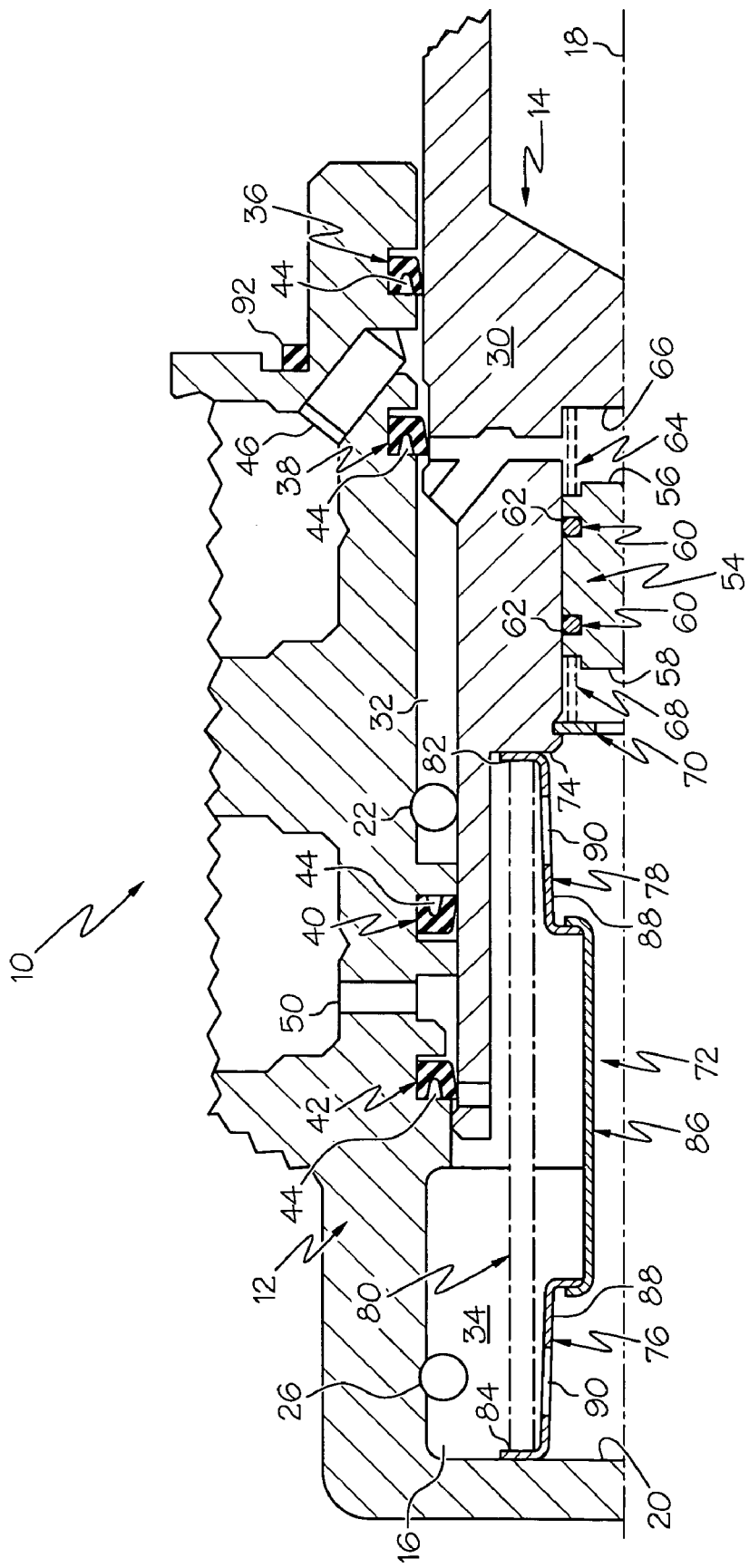
FIG. 2 is an above centerline, side elevational, cross sectional view of the embodiment of the brake apply master cylinder of FIG. 1, wherein the single brake apply piston is shown disposed longitudinally rearward in its brake release (rest) position, and wherein the front of the brake apply master cylinder is the left-most end of FIG. 2.

A first embodiment of a brake apply master cylinder 10 is shown in FIGS. 1-2. A first expression of the embodiment of FIGS. 1-2 is for a brake apply master cylinder 10 including a brake-apply-master-cylinder body 12 and a piston assembly 14. The brake-apply-master-cylinder body 12 includes a bore 16. The bore 16 has a longitudinal axis 18, a closed front end 20, a primary fluid outlet 22 fluidly connectable to a primary brake circuit 24, and a secondary fluid outlet 26 fluidly connectable to a secondary brake circuit 28. The piston assembly 14 includes a single brake apply piston 30 disposed in the bore 16. The piston assembly 14 fluidly divides the bore 16 into a primary fluid chamber 32 in fluid communication with the primary fluid outlet 22 and a secondary fluid chamber 34 in fluid communication with the secondary fluid outlet 26. The primary fluid chamber 32 has a first chamber volume and the secondary fluid chamber 34 has a second chamber volume. Longitudinal forward movement of the single brake apply piston 30 reduces the first and second chamber volumes.

The longitudinal axis 18 is a central longitudinal axis. There is no other brake apply piston (i.e., a master cylinder piston whose longitudinal forward movement causes brake apply and whose longitudinal rearward movement causes brake release) disposed in the bore 16. By longitudinal forward movement is meant longitudinal movement toward the closed front end 20 of the bore 16. By longitudinal rearward movement is meant longitudinal movement away from the closed front end 20 of the bore 16.

In one usage, brake fluid (not shown) is disposed in the bore 16 and the primary and secondary brake circuits 24 and 28. In one example, longitudinal forward movement of the single brake apply piston 30 is caused by depressing a brake pedal with booster assist (such brake pedal and booster not shown). In this example, such forward longitudinal movement of the single brake apply piston 30 compresses the brake fluid in the primary and secondary fluid chambers 32 and 34 and hence in the primary and secondary brake circuits 24 and 28 which causes vehicle wheel brakes (not shown) to be applied.

In one enablement of the first expression of the embodiment of FIGS. 1-2, the brake apply master cylinder 10 also includes a plurality of annular seals 36, 38, 40 and 42 radially disposed between the single brake apply piston 30 and the brake-apply-master-cylinder body 12. In one variation, the brake-apply-master-cylinder body 12 has a plurality of grooves 44, and the annular seals 36, 38, 40 and 42 are each disposed in a corresponding groove 44. In one modification, the bore 16 has a primary fluid inlet 46 fluidly connectable to a primary brake fluid reservoir 48 and a secondary fluid inlet 50 fluidly connectable to a secondary brake fluid reservoir 52. In one illustration, the primary fluid inlet 46 only supplies the primary fluid chamber 32 with brake fluid and the secondary fluid inlet 50 only supplies the secondary fluid chamber 34 with brake fluid. In one employment, the primary and secondary brake fluid reservoirs 48 and 52 are reservoirs of a brake fluid tank 53 mounted on top of the brake-apply-master-cylinder body 12.

In one implementation, the plurality of annular seals 36, 38, 40 and 42 includes a first annular seal 36 disposed proximate and longitudinally rearward of the primary fluid inlet 46, a second annular seal 38 disposed proximate and longitudinally forward of the primary fluid inlet 46, a third annular seal 40 disposed proximate and longitudinally rearward of the secondary fluid inlet 50, and a fourth annular seal disposed proximate and longitudinally forward of the secondary fluid inlet 50. In one employment, the first, second and fourth annular seals 36, 38 and 42 are lip seals which face longitudinally forward, and the third annular seal 40 is a lip seal which faces longitudinally rearward to isolate the primary fluid chamber 32 from the primary fluid inlet 46 and the secondary fluid chamber 34 from the secondary fluid inlet 50 during a longitudinal forward, brake apply movement of the single brake apply piston 30.

A second expression of the embodiment of FIGS. 1-2 is for a brake apply master cylinder 10 including a brake-apply-master-cylinder body 12 and a piston assembly 14. The brake-apply-master-cylinder body 12 includes a bore 16. The bore 16 has a longitudinal axis 18, a closed front end 20, a primary fluid outlet 22 fluidly connectable to a primary brake circuit 24, and a secondary fluid outlet 26 fluidly connectable to a secondary brake circuit 28. The piston assembly 14 includes a single brake apply piston 30 and a pressure equalization piston 54 each disposed in the bore 16. The pressure equalization piston 54 is slidably engageable with and disposed radially inward of the single brake apply piston 30. The single brake apply piston 30 and the pressure equalization piston 54 together fluidly divide the bore 16 into a primary fluid chamber 32 in fluid communication with the primary fluid outlet 22 and a secondary fluid chamber 34 in fluid communication with the secondary fluid outlet 26. The primary fluid chamber 32 has a first chamber volume and the secondary fluid chamber 34 has a second chamber volume. Longitudinal forward movement of the single brake apply piston 30 reduces the first and second chamber volumes. The pressure equalization piston 54 has a first end 56 in fluid communication with the primary fluid chamber 32 and a second end 58 in fluid communication with the secondary fluid chamber 34.

In one enablement of the second expression of the embodiment of FIGS. 1-2, the piston assembly 14 includes a plurality of seals 60 disposed radially between the pressure equalization piston 54 and the single brake apply piston 30. In one variation, the pressure equalization piston 54 includes a plurality of annular surface recesses 62, and the seals 60 are each disposed in a corresponding annular surface recess 62. In one modification, the seals 60 are O-ring seals.

In one illustration of the second expression of the embodiment of FIGS. 1-2, the piston assembly 14 includes a first centering spring 64 (represented by two horizontally-extending broken lines) extending longitudinally from the first end 56 of the pressure equalization piston 54 to a centering spring seat 66 of the single brake apply piston 30. In one variation, the piston assembly 14 includes a second centering spring 68 (represented by two horizontally-extending broken lines) extending longitudinally forward from the second end 58 of the pressure equalization piston 54. In one modification, the piston assembly 14 includes an annular lock ring 70 attached to the single brake apply piston 30, wherein the second centering spring 68 extends longitudinally forward to and seats against the annular lock ring 70.

A third expression of the embodiment of FIGS. 1-2 is for a brake apply master cylinder 10 including a brake-apply-master-cylinder body 12, a piston assembly 14, and a return spring assembly 72. The brake-apply-master-cylinder body 12 includes a bore 16. The bore 16 has a longitudinal axis 18, a closed front end 20, a primary fluid outlet 22 fluidly connectable to a primary brake circuit 24, and a secondary fluid outlet 26 fluidly connectable to a secondary brake circuit 28. The piston assembly 14 includes a single brake apply piston 30 disposed in the bore 16. The piston assembly 14 fluidly divides the bore 16 into a primary fluid chamber 32 in fluid communication with the primary fluid outlet 22 and a secondary fluid chamber 34 in fluid communication with the secondary fluid outlet 26. The primary fluid chamber 32 has a first chamber volume and the secondary fluid chamber 34 has a second chamber volume. Longitudinal forward movement of the single brake apply piston 30 reduces the first and second chamber volumes. The return spring assembly 72 is positioned in the bore 16 and extends from the closed front end 20 to a return-spring seat 74 of the single brake apply piston 30.

In one enablement of the third expression of the embodiment of FIGS. 1-2, the return spring assembly 72 includes a front spring stop member 76 contacting the closed front end 20, a rear spring stop member 78 contacting the return-spring seat 74, and a coil spring 80 (represented by two horizontally-extending broken lines) having a first end 82 contacting the rear spring stop member 78 and a second end 84 contacting the front spring stop member 76. In one variation, the return spring assembly 72 includes a hollow pin 86 extending between and limiting outward longitudinal movement of the front and rear spring stop members 76 and 78. In one modification, the front and rear spring stop members 76 and 78 each include an annularly cylindrical wall 88 having at least one through hole 90. In this enablement, the return spring assembly 72 is a caged spring assembly wherein the front and rear spring stop members 76 and 78 move longitudinally inward with respect to the hollow pin 86 when the single brake apply piston 30 moves longitudinally forward compressing the coil spring 80.

In one employment of the third expression of the embodiment of FIGS. 1-2, the brake apply master cylinder 10 also includes a plurality of annular seals 36, 38, 40 and 42 radially disposed between the single brake apply piston 30 and the brake-apply-master-cylinder body 12. In one variation, the brake-apply-master-cylinder body 12 has a plurality of grooves 44, and the annular seals 36, 38, 40 and 42 are each disposed in a corresponding groove 44. In one modification, the annular seals 36, 38, 40 and 42 are lip seals.

In the same or a different employment, the piston assembly 14 includes a pressure equalization piston 54 disposed in the bore 16, wherein the pressure equalization piston 54 is slidably engageable with and disposed radially inward of the single brake apply piston 30. In one variation, the single brake apply piston 30 and the pressure equalization piston 54 together fluidly divide the bore 16 into the primary fluid chamber 32 and the secondary fluid chamber 34. In one modification, the pressure equalization piston 54 has a first end 56 in fluid communication with the primary fluid chamber 32 and a second end 58 in fluid communication with the secondary fluid chamber 34.

A method of assembly of an example of the embodiment of FIGS. 1-2 includes disposing the first, second, third and fourth annular seals 36, 38, 40 and 42 in a corresponding one of the grooves 44 of the brake-apply-master-cylinder body 12. Then the return spring assembly 72 is disposed in the bore 16. Then the piston assembly 14 is disposed in the bore 16. Then, in one extension, a boot nose seal 92 is installed and a seal global style booster (not shown) is operatively connected to the brake apply master cylinder 10. In one design, the return spring assembly 72 is disposed partially in a larger-diameter bore of the single brake apply piston 30 and the pressure equalization piston 54 and associated components are disposed in a smaller-diameter bore of the single brake apply piston 30 as shown in FIG. 2. In one deployment, movement of the pressure equalization piston 54 is minimized by selecting the left-side and right-side outer diameters of the pressure equalization piston 54 of FIG. 2 to closely correspond to the front and rear displacement relationships relative to each other, as can be appreciated by those skilled in the art.

Several benefits and advantages are derived from one or more of the expressions of an embodiment of the invention. In one example, the single brake apply piston reduces total piston stroke compared to the total piston stroke of a conventional system having two brake apply pistons and an intervening spring.

The foregoing description of several expressions of an embodiment of the invention has been presented for purposes of illustration. It is not intended to be exhaustive or to limit the invention to the precise forms disclosed, and obviously many modifications and variations are possible in light of the above teaching. It is intended that the scope of the invention be defined by the claims appended hereto.

The invention claimed is:

1. A brake apply master cylinder comprising:
   a) a brake-apply-master-cylinder body including a bore, wherein the bore has a longitudinal axis, a closed front end, a primary fluid outlet fluidly connectable to a primary brake circuit, and a secondary fluid outlet fluidly connectable to a secondary brake circuit;
   b) a piston assembly including a single brake apply piston disposed in the bore; wherein the piston assembly fluidly divides the bore into a primary fluid chamber in fluid communication with the primary fluid outlet and a secondary fluid chamber in fluid communication with the secondary fluid outlet, wherein the primary fluid chamber has a first chamber volume and the secondary fluid chamber has a second chamber volume, and wherein longitudinal forward movement of the single brake apply piston reduces the first and second chamber volumes; and
   c) a return spring assembly disposed in the bore and extending from the closed front end to a return-spring seat of the single brake apply piston;
   wherein the return spring assembly includes a front spring stop member contacting the closed front end, a rear spring stop member contacting the return-spring seat, and a coil spring having a first end contacting the rear spring stop member and a second end contacting the front spring stop member, and wherein the return spring assembly includes a hollow pin extending between and limiting outward longitudinal movement of the front and rear spring stop members, and further wherein the front and rear spring stop members each include an annularly cylindrical wall having at least one through hole.

* * * * *